United States Patent [19]

Kota

[11] Patent Number: 5,107,719

[45] Date of Patent: Apr. 28, 1992

[54] ADJUSTABLE ROBOTIC MECHANISM

[75] Inventor: Sridhar Kota, Ann Arbor, Mich.

[73] Assignee: The University of Michigan, Ann Arbor, Mich.

[21] Appl. No.: 574,349

[22] Filed: Aug. 28, 1990

[51] Int. Cl.⁵ .............................................. B25J 11/00
[52] U.S. Cl. .......................................... 74/479; 74/522; 74/586; 901/15; 414/917; 414/744.5
[58] Field of Search .............. 74/479, 522, 586, 89.15; 901/15; 414/744.5, 917

[56] References Cited

U.S. PATENT DOCUMENTS

| | | | |
|---|---|---|---|
| 1,752,028 | 3/1930 | Ritchie | 74/586 |
| 4,095,481 | 6/1978 | Kasai et al. | 414/917 X |
| 4,712,971 | 12/1987 | Fyler | 901/15 X |
| 4,730,975 | 3/1988 | Munakata | 414/744.5 X |
| 4,756,662 | 7/1988 | Tanie et al. | 901/15 X |
| 4,762,016 | 8/1988 | Stoughton et al. | 74/479 |
| 4,806,068 | 2/1989 | Kohli et al. | 74/479 X |
| 4,904,152 | 2/1990 | Doi et al. | 414/917 X |

FOREIGN PATENT DOCUMENTS 0327094  8/1989  European Pat. Off. .............. 901/15
1341017  9/1987  U.S.S.R. .............................. 901/15

*Primary Examiner*—Allan D. Herrmann
*Assistant Examiner*—Julie Krolikowski
*Attorney, Agent, or Firm*—Rohm & Monsanto

[57] ABSTRACT

A closed loop multi-link robotic apparatus is actuated to produce two-dimensional motion with respect to a base member. The base member is coupled to an actuator which, in a practical embodiment of the invention, moves the base member along a part which is rectilinearly orthogonal with the respect to the two-dimensional motion. A correlator, which may be an electronic system, controls the actuator to produce a predetermined composite three-dimensional motion which can be adapted to performed industrial automation tasks. Adjustability of the system is achieved by providing a mechanism for adjusting the length of one or more of the links. Additionally, other elements may be varied, such as an angular relationship between various ones of the rigid links or the angular relationship between an end-effector coupler and the multi-link system. In some embodiments, the changes in link length may be correlated to the position of the actuator.

19 Claims, 2 Drawing Sheets

ADJUSTABLE ROBOTIC MECHANISM

BACKGROUND OF THE INVENTION

This invention relates generally to robotic systems of the type which are employed in automation, and more particularly, to a robotic system which provides a measure of flexibility intermediate of cam-driven or linkage-based conventional mechanisms, which provide no flexibility, and serial robots which provide great flexibility, but at high cost.

There is a need to provide a robotic system which is useful in automation and achieves a reasonable measure of flexibility at relatively low cost. The term "flexibility" refers to the ability of a robotic system to be deployable to perform a variety of tasks. In this context, the term "task" refers to a mechanized motion in one, two, or three dimensional space along a prescribed path.

Hard automation systems, which include systems which operate in response to cam drives or linkage-based mechanisms, provide no flexibility. However, such systems provide significant operational advantages, such as high-speed applications, as well as good accuracy and repeatability. Serial robots, on the other hand, such as a six-axis industrial robot, can be recycled by simply reprogramming the robot to perform any one or more of a great variety of different tasks within it working envelope. Quite often, however, there is not a need for such great flexibility, although there is a need for some flexibility greater than that which is afforded by hard automation systems. In other words, there is a need for a semi-flexible automation system.

Serial industrial robots are widely employed in automated manufacturing operations, such as in the assembly of mechanical and electronic components, welding, painting, sealing, etc.. flexible manufacturing applications demand the use of such expensive robots. There are, however, many applications where serial six-axis robots are not often recycled from one task to another, and therefore there is a great expense associated with a flexibility which is not required. In addition, in certain automated environments where six-axis robots are employed, there is not a need for five or more degrees of freedom. Thus, there is a need for a system which can operate in the middle ground between serial robots and hard automation. Such an intermediate system should be reconfigurable with limited flexibility, yet achieve operational efficiency and cost-effectiveness.

The need for only limited flexibility arises from the fact that in most manufacturing environments, there will always be fundamental similarities between the different products on a given production line. Such similarities include, for example, overall size, overall weight, desired mechanical paths, etc. Consequently, there are present corresponding similarities in the robot workspace requirements, the paths traced by the end-effector, the accuracy and precision with which the task must be accomplished, and the operating speed. For example, it is not likely that computers and refrigerators would be manufactured on the same production line, even at different times. Yet, different models of computers or different models of refrigerators may be manufactured or assembled on a particular production line, and there would be only limited differences between the various models within each such product line.

It is, therefore, an object of this invention to provide an inexpensive robotic system which exhibits greater flexibility than conventional hard automation systems.

It is another object of this invention to provide a robotic mechanism which can achieve high-speed operation.

It is also an object of this invention to provide a light weight robotic mechanism.

It is a further object of this invention to provide an adjustable robotic mechanism which can achieve high accuracy and repeatability.

It is additionally an object of this invention to provide a robotic system which can perform tasks requiring motion having two or more dimensions of freedom while employing relatively few actuators and a simple control system.

It is a yet further object of this invention to provide a robotic system which can easily and inexpensively achieve continuous trajectories point-to-point.

It is also another object of this invention to provide a robotic system which is modular in its construction.

It is yet an additional object of this invention to provide a system for designing closed loop actuation mechanisms to achieve predeterminable motion of an end-effector.

It is still another object of this invention to provide a system for illustrating the effect of adjustability of design parameters on the shape of trajectories traced by an end-effector.

SUMMARY OF THE INVENTION

The foregoing and other objects are achieved by this invention which provides, in a first apparatus aspect thereof, a robotic system for moving an end-effector along a predeterminable path. In accordance with the invention, a link arrangement is provided which is formed of a plurality of rigid link members coupled to one another at a respective plurality of link coupling points. Thus, the link arrangement has at least first and second ends. The link arrangement is supported by a base. An actuator is coupled to at least the first end of the link arrangement and urges this first end into a first predeterminable motion with respect to the base. The first predeterminable motion is arranged along a first path of travel and has at least a first dimensional component. An end-effector, which is desired to be moved along a predetermined path, is coupled to the link arrangement by a coupling member. The coupling between the link arrangement and the end-effector is located at an end-effector coupling point on the link arrangement which is intermediate of the first and second ends. In the practice of the invention, the end-effector coupling point is urged to travel along a first predeterminable end-effector coupling point travel path which has a second dimensional component. The second end of the link arrangement is coupled so as to form a closed loop between the first and second ends of the link arrangement.

In one specific illustrative embodiment of the invention, there is further provided a second actuator coupled to the base. This actuator moves the base so as to produce three-dimensional travel of the end-effector coupling point. In a preferred embodiment, the second actuator produces rectilinear motion along a third dimension.

In a further embodiment of the invention, the second end of the link arrangement is coupled to a third actuator which urges same into a second predeterminable motion with respect to the base. The second predeterminable motion is preferably along a second path of travel which has at least a first dimensional component associated therewith. In such an embodiment, the predeterminable motion of the second end coupling means combines with the motion of the first end to produce a composite end-effector coupling point travel path having first and second dimensional components. There further may be provided a synchronizer arrangement, which may be in form of a gear, for coordinating the operation of the first and third actuators.

In a specific illustrative embodiment of the invention, the first actuator synchronizer is provided with a rate controller for maintaining a predetermined relationship between the respective rates of operation of the first and second actuators. In addition, the first actuator synchronizer may be employed to maintain a predetermined phase relationship between the first and third actuators.

In a further embodiment, at least one of the original link members provided with a length adjustment apparatus which produces a variation in the predeterminable end-effector coupling point traveling path. Additionally, the synchronizer may be employed to maintain a predetermined phase relationship between the first and third actuators.

In another embodiment of the invention, the end-effector may be coupled to the link arrangement by an end-effector arm. The point of communication between the end-effector arm and the link arrangement may be, in certain embodiments, able to form an adjustable angle therebetween. Changes in the angle will have a corresponding effect on the path travelled by the end-effector.

In certain embodiments, one or more individual rigid links of the link arrangement may be provided with associated apparatus for adjusting the length thereof. Variations in length of the links will cause corresponding variations in the path travelled by the various portions of the link arrangement. As will be discussed herein, such a length adjustment apparatus may be in the form of a motorized system, such as a motorized screw thread arrangement. The motor may be applied to vary the length of the associated rigid link in response to the operation of the first actuator. Thus, as the link arrangement is moved, the link length is varied in accordance with a predetermined relationship.

In accordance with a further system aspect of the invention, a closed loop linkage system is provided having first and second ends and plurality of rigid links therebetween. A link actuator urges the first end of the closed loop linkage system into motion along a first predetermined path. The link actuator and the closed loop linkage system are arranged on a base which is itself acted upon by a base actuator for urging the base into motion along a second predetermined path. Thus, the motion of the closed loop linkage system is a composite motion along a path which is the combination of the first and second predetermined paths.

In a specific embodiment of this system aspect of the invention, a link adjustment device is provide for varying a predetermined characteristic of at least one of the rigid links. The predetermined characteristic may correspondence to link length, or an angular relationship between the rigid links themselves.

In a practical embodiment of the invention, such as in a manufacturing environment, an end-effector is provided for performing the desired work. Such an end-effector may be a gripping clamp, a paint sprayer, or any other end-effector which may be in use in automated manufacturing. The end-effector is coupled to the closed loop linkage system by a coupler, which may be in the form of an arm. An actuator may be provided for adjusting the orientation between the end-effector coupler and the closed loop linkage system.

In accordance with a method aspect of the invention, a method of driving a robotic apparatus along a three-dimensional path includes the steps of:

first driving at least one link directly of a multi-link closed loop mechanism installed on a base to produce a predetermined two-dimensional motion along a predetermined first path with respect to the base of a selected portion of the multi-link closed loop mechanism; and second driving the base along a predetermined second path in a third dimension of travel, whereby the selected portion of the multi-link closed loop mechanism is driven along a composite path having first, second, and third dimensional components.

In a specific embodiment of this method aspect of the invention, there are provided the further steps of:

driving directly a first link of the multi-link closed loop mechanism;

driving directly a second link of the multi-link closed loop mechanism; and correlating the steps of driving directly.

The step of correlating, in some embodiments, includes the step controlling respective rates of operation. I other embodiments, this step includes the step controlling a phase relationship between the steps of driving directly the first and second links.

In accordance with a further embodiment of this method aspect of the invention, there is provided the further step of adjusting a predetermined parameter associated with at least one of the links in the multi-link closed loop mechanism. This predetermined parameter corresponds, in certain embodiments, to the length of the link. In other embodiments, it may correspond to an effective curvature of the link.

BRIEF DESCRIPTION OF THE DRAWING

Comprehension of the invention is facilitated by reading the following detailed description, in conjunction with the annexed drawing, in which.

DETAILED DESCRIPTION

Figure 1:
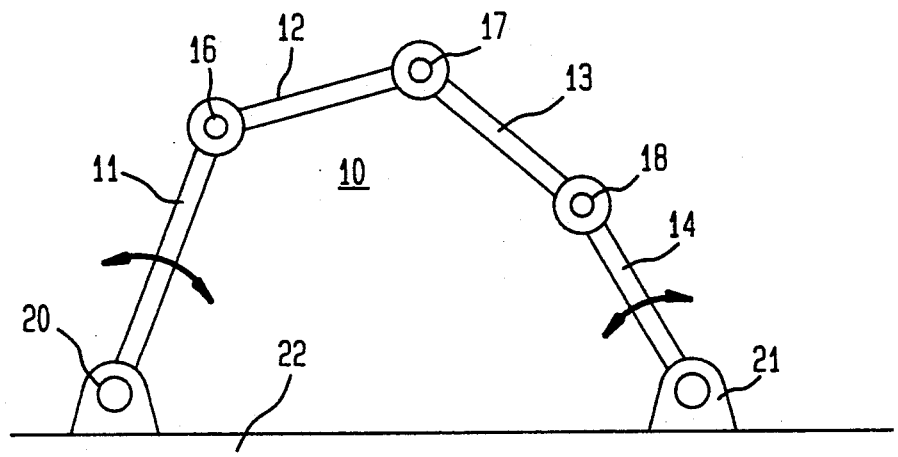
FIG. 1 is a simplified schematic illustration of a generalized five-bar mechanism which is characterized with two degrees of freedom.

FIG. 1 is a simplified schematic illustration of a generalized five-bar closed loop mechanism 10. The mechanism shown in this figure is termed a "five-bar closed loop mechanism" because its supporting platform (platform member 22) functions as a fixed link. The mechanism is formed of rigid links 11, 12, 13 and 14, which are coupled to each other, in this specific embodiment, by pivots 16, 17 and 18. The mechanism is coupled at respective first and second ends thereof to actuators 20 and 21 which are installed on platform member 22 in fixed relationship with respect to one another. Thus, mechanism 10 forms a closed-loop with platform member 22.

As indicated by the arrows in the vicinity of rigid links 11 and 14, actuators 20 and 21 operate to cause the links coupled thereto to be rotated in a substantially radial manner. The mechanism 1 is considered to have two degrees of freedom in that there are two actuators, 20 and 21, which can function independently of one another. The path which will be followed by any given point along the chain of rigid links, such as pivot 17, is related to the direction of rotation of the actuators, the phase angle between the actuators, the lengths of the links, including the distance between the first and second ends of the mechanism, etc. Thus, there are a large number of parameters which can be varied to achieve a predetermined path of travel for a given point on the mechanism.

Figure 2:
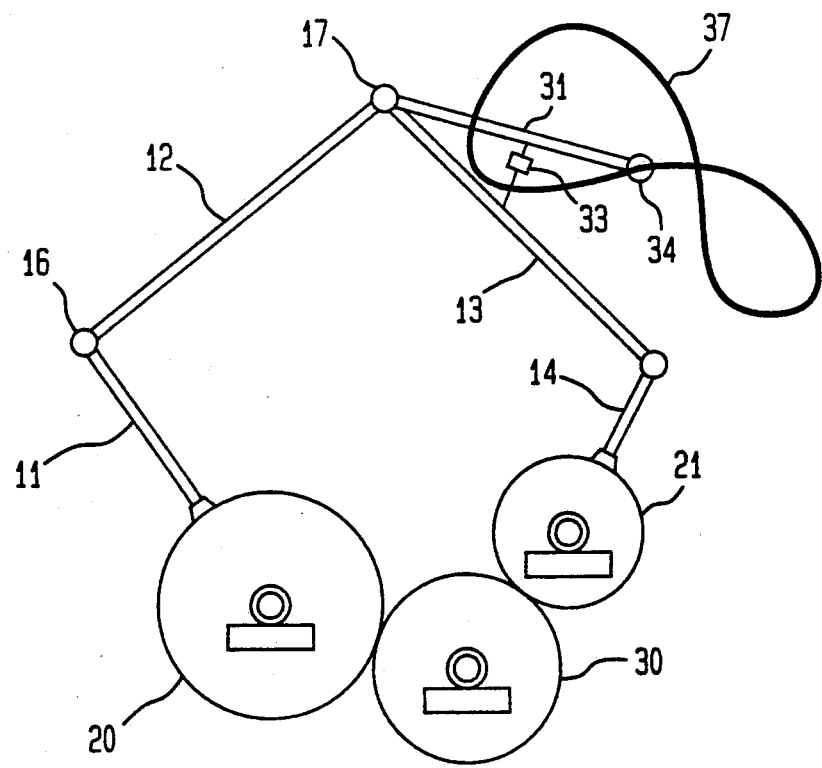
FIG. 2 is a schematic illustration of a five-bar mechanism which has a single degree of freedom.

FIG. 2 is a schematic illustration of a geared 5-bar mechanism which has a single degree of freedom. In this embodiment, elements of structure which find analogous correspondence to the elements of structure discussed hereinabove with respect to FIG. 1 are similarly designated. In this specific embodiment, actuators 20 and 21 are illustrated schematically as gears which are coupled to one another by an idler gear 30. It is to be understood that the schematic representation of idler gear 30 may include a train of gears or other mechanisms which define a predetermined operating relationship between actuators 20 and 21. In certain embodiments, for example, actuators 20 and 21 may be "digital gears," illustratively in the form of controlled motors, and either gear 30 may be a controlled system which maintains a fixed relationship, illustratively with respect to speed, phase, or extent of travel, to achieve a desired operating path.

In addition to the foregoing, the embodiment of FIG. 2 illustrates a link 31 which is coupled at one end to pivot 17 and may have a fixed angular relationship with respect to rigid link 13. In certain embodiments, an actuator 33 may be employed to control the angular relationship between links 13 and 31, and adjust same to achieve a desired operating path. In addition to the foregoing, as will be discussed hereinbelow, one or more of the rigid links may be provided with apparatus for adjusting the length thereof, and thereby producing a corresponding variation in the path. In this figure, end point 34 of arm 31 traces a path 37 which, as previously indicated, can be modified by varying the parameters identified herein.

Figure 3:
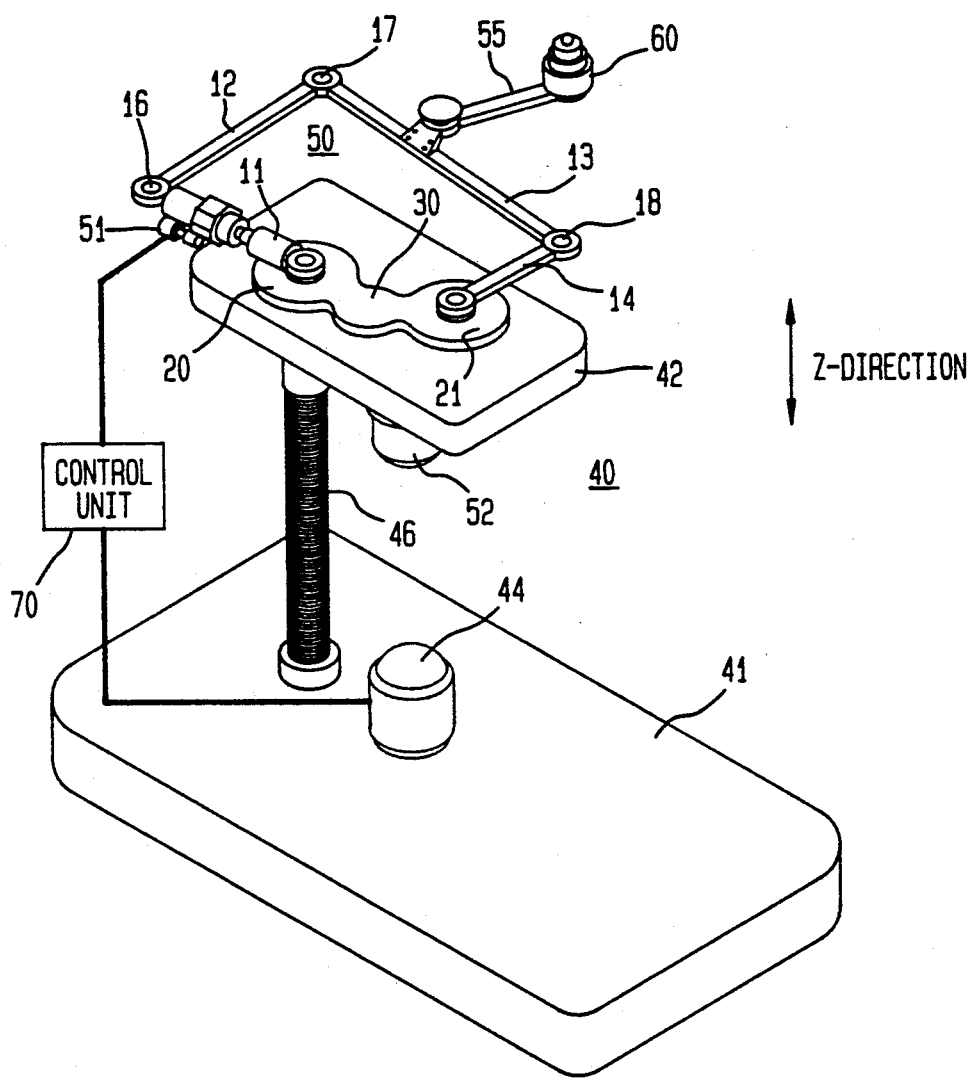
FIG. 3 is a simplified schematic illustration of an adjustable robotic mechanism with an adjustable link and an actuator for displacing the mechanism vertically.

FIG. 3 is a simplified schematic illustration of a practical embodiment of the invention. As shown, a 3-dimensional robotic system 40 is provided with a support 41 and a platform 42 which have an adjustable distance between them. Adjustability is achieved by operation of an actuator 44 which, in this specific illustrative embodiment, corresponds to a motor which cooperates with a screw threaded shaft 46. As shown, screw threaded shaft 46 is translated axially, in response to actuator 44.

The axial translation of screw threaded shaft 46, causes the platform an a five-bar mechanism 50 to be moved in the z direction. Thus, two-dimensional motion effected by mechanism 50 is superimposed on the third dimension. In some applications, superpositioning of a third dimension may not be necessary. In such cases, the adjustable mechanism, such as mechanism 50, alone would be sufficient to trace a variety of one-dimensional or two-dimensional paths. Mechanism 50 may be actuated in response to the operation of an actuator 52.

Of course, the invention is not limited to the embodiment shown herein, since many parameters of the system can be varied within the scope of the claimed invention. For example, the axis of screw threaded shaft 46 need not be perpendicular to the two-dimensional motion of five-bar mechanism 50. Other angles may be employed, and the path along which the platform is moved with respect to the support need not be linear.

Five-bar mechanism 50 is similar to that described above with respect to FIG. 2, and therefore corresponding elements of structure are similarly designated. In this embodiment, however, link 11 is provided with a length adjustment mechanism 51, which is in the form of a motor-actuated arrangement which operates a screw-threaded extension apparatus. Any of several known arrangements may be employed in the practice of this aspect of the present invention. Actuators 44 and 52 may be operated in coordinated manner by operation of a controller unit 70. In other embodiments, length adjustment mechanism 51 may also be operated under the control of control unit 70.

In this embodiment, link 13 has coupled thereto an end-effector coupler arm 55 which has installed, at a distal end thereof, an end-effector 60. As previously noted, end-effector 60 may be any known apparatus employed in automated manufacturing systems, such as spray painting equipment, welding equipment, sealant dispensing devices, robotic clamping and gripping systems, etc.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A robotic system for moving an end-effector along a predeterminable path, the robotic system comprising:

link means formed of a plurality of rigid link members coupled to one another at a respective plurality of link coupling points, said link means having first and second ends;

base means for supporting said link means;

first actuator means coupled to at least said first end of said link means for urging said first end of said link means into a first predeterminable motion with respect to said base means, said first predeterminable motion being along a first path of travel having at least a first dimensional component;

link length adjustment means for adjusting a length characteristic of at least one of said rigid link members, said link length adjustment means being responsive to the operation of said first actuator means;

end-effector coupling means for coupling the end-effector to said link means, said coupling between said link means and the end-effector being located at an end-effector coupling point on said link means intermediate of said first and second ends, said end-effector coupling point being urged along a first predeterminable end-effector coupling point travel path having said first and a second dimensional components; and second end coupling means for forming a closed loop between said first and second ends of said link means.

2. The robotic system of claim 1 wherein there is further provided second actuator means coupled to said base means for moving said end-effector coupling point along a second predeterminable end-effector coupling point travel path having a third dimensional component, said end-effector thereby being urged along a three-dimensional path.

3. The robotic system of claim 2 wherein said second coupling means is coupled to said base means.

4. The robotic system of claim 2 wherein said second actuator produces rectilinear motion along said third dimension.

5. The robotic system of claim 1 wherein said second end coupling means couples said second end of said link means to a third actuator means, said third actuator means urging said second end of said link means into a second predeterminable motion with respect to said base means, said second predeterminable motion being along a second path of travel having at least a first dimensional component.

6. The robotic system of claim 5 wherein said second predeterminable motion of said second end coupling means combines with said first predetermined motion of said first end to produce a predeterminable composite end-effector coupling point travel path having first and second dimensional components.

7. The robotic system of claim 5 wherein there is further provided first actuator synchronizer means for coordinating the operation of said first and third actuator means.

8. The robotic system of claim 7 wherein said first actuator synchronizer means is provided with rate control means for maintaining a predetermined relationship between respective rates of operation of said first and third actuator means.

9. The robotic system of claim 7 wherein said first actuator synchronizer means is provided with phase control means for maintaining a predetermined phase relationship between said first and third actuator means.

10. The robotic system of claim 1 wherein there is further provided length adjustment means associated with at least one of said rigid link members for producing a variation in said first predeterminable end-effector coupling point travel path.

11. The robotic system of claim 1 wherein said end-effector coupling means comprises an end-effector arm.

12. The robotic system of claim 1 wherein said end-effector coupling means couples to said link means at an adjustable angle with respect thereto.

13. A method of driving a robotic apparatus along a three-dimensional path, the method comprising the steps of:
driving directly a first link of said multi-link closed loop mechanism;
driving directly a second link of said multi-link closed loop mechanism;
controlling respective rates of operation of said steps of driving directly; and
second driving said base along a predetermined second path in a third dimension of travel, whereby said selected portion of said multi-link closed loop mechanism is driven along a composite path having first, second, and third dimensional components.

14. The method of claim 13 wherein said step of correlating comprises the step controlling a phase relationship between said steps of driving directly.

15. The method of claim 13 wherein there is further provided the step of adjusting a predetermined parameter associated with at least one of said links in said multi-link closed loop mechanism.

16. The method of claim 15 wherein said predetermined parameter corresponds to a length of said link.

17. A robotic system comprising:
a closed loop linkage system having first and second ends and a plurality of rigid links therebetween;
link actuator means for urging said first end of said closed loop linkage system into motion along a first predetermined path;
base means for supporting said closed loop linkage system and said link actuator means;
base actuator means for urging said base means into motion along a second predetermined path; and
link adjustment means for varying a link length characteristic of at least one of said rigid links in response to said link actuator means.

18. The robotic system of claim 17 wherein there is further provided end-effector coupling means, and said predetermined characteristic corresponds to an orientation between said end-effector coupling means and said closed loop linkage system.

19. The robotic system of claim 17 wherein there is further provided actuator correlator means for coordinating the operation of said link actuator means and said base actuator means.

* * * * *